United States Patent Office 3,531,409
Patented Sept. 29, 1970

3,531,409
SOLID SOLUTIONS OF CORROSION INHIBITORS FOR USE IN TREATING OIL WELLS
William E. Seffens and James B. Jochens, St. Louis, Mo., assignors to Petrolite Corporation, Wilmington, Del., a corporation of Delaware
No Drawing. Filed Jan. 6, 1967, Ser. No. 607,645
Int. Cl. C23f *11/10;* E21b *43/25;* C09k *3/00*
U.S. Cl. 252—8.55                    8 Claims

ABSTRACT OF THE DISCLOSURE

Solid solutions of chemicals dissolved in a solid carrier, as illustrated by chemicals capable of being employed in petroleum operations such as corrosion inhibitors, demulsifiers, bactericides, scale preventitives, paraffin removers, etc. dissolved in a carrier comprising for example polymers and waxes, where the chemical is eluted into the system while the carrier is substantially insoluble in the system.

---

This invention relates to solid solutions of chemical and to use thereof. More particularly this invention relates to solid solutions of chemicals useful in petroleum operations.

This invention also relates to particulate solid units or pellets of chemicals useful in petroleum operations, such as corrosion inhibitors, etc., containing a solid carrier and a chemical dissolved in said carrier, said carrier being substantially insoluble in the system in which it is employed, said dissolved chemicals, such as a corrosion inhibitor, being capable of elution, i.e. being leached out from the carrier by the system over an extended period of time.

Heretofore, chemicals have been used in many phases of petroleum operations. For example, corrosion inhibitors have been employed as solutions, sticks, solid granules, etc. However, these forms of corrosion inhibitors have certain deficiencies. For example, they may be used up at too rapid a rate. They may be wasteful because of overdosages and underdosages depending on conditions. Wax sticks or granules of corrosion inhibitors do not fully solve the problem since they dissolve too rapidly in the system and thus have a relatively short life.

Recently, increasing emphasis has been placed on long lasting petroleum chemicals such as corrosion inhibitors, since, because of economics and other reasons, it is highly desirable to eliminate the labor factor in oil processing.

We have now discovered that certain solid solutions of chemicals, such as corrosion inhibitors, solve the problem of long action in situ without repeated dosages.

The compositions of this invention are solid solutions of chemicals in an auxiliary material or carrier capable of forming solid solutions thereof. In practice polymers and/or waxes are employed as carriers. The choice of the particular polymer or wax will depend on various factors such as, for example, the compatibility of the chemical and the polymer, the corrosive system in which it is to be employed, such as whether it is primarily a water or a hydrocarbon system, or both, etc. In addition, it is very important that the chemical be leached out of the solid solution by the system at a slow, but effective rate, so that its action is long lived according to the rate desired.

Thus, in general, where the solid solution comes in contact with the corrosive system it is generally desirable to employ a polymer or wax from which the solid solution of the chemical can be leached out at a slow rate and in which the polymer or wax is insoluble. Depending on the system one might select a water sensitive polymer such as a high molecular weight polyalkyleneetherglycol such as "Polyox," polyvinyl alcohol, cellulose, etc., or a hydrocarbon sensitive polymer, such as, for example, nylon, polystyrene, polyvinylchloride, polyvinylidene chloride, phenolic-aldehyde resins, polyalkylene resins, such as polyethylene, Fisher Tropsch waxes, etc., acrylic resins, polyester resins, alkyd resins, etc., waxes such as microcrystalline waxes, etc., blends of both hydrocarbon and water sensitive polymers, etc.

In addition to selecting a suitable carrier polymer or wax, etc., in which a solid solution of the chemical can be made, the selected carrier must be one on which the corrosive system has the proper extractive or elution effect. For example, if a hydrocarbon soluble polymer were employed in a hydrocarbon system it would release the corrosion inhibitor immediately so that its effect would be too short lived. The same would be true of a water soluble polymer in any aqueous system. Stated another way, the carrier selected should be insoluble in the system in order to retain its integral form while releasing the chemical. The solid solution should maintain its integral structure and allow the chemical to be leached out over an extended period of time. Stated another way, the active ingredient goes but the carrier remains. In this way, the action of the chemical is of long and continuous duration.

In addition, it is desirable to have other properties in the product, for example, the solid product should have good impact resistance, proper melting points to withstand oil well temperatures, etc., be capable of being formed into spherical beads of the right diameter, etc.

The term "solid solution" as employed herein relates in general to a chemical and a carrier in which the chemical and a carrier in which the chemical is dissolved or intimately mixed in such a way that the chemical can be leached out at the desired rate. The rates will vary with the particular solid solution and the particular system. Elution rates of about 0.1% to 100%/day, such as about .05 to 10%/day for example about .75 to 5%/day, but preferably about .1% to 1.0%/day have been obtained. The carrier may swell or slightly dissolve but in general it retains its integral structure during the elution period.

The percent of active ingredient in the carrier will vary widely depending on many factors such as solubility in the carrier, solubility in the system, etc. In practice, one tries to dissolve as much active ingredient in the carrier consistent with the desired result, for example, from about 1 to 90% by weight of the total composition, such as from about 10 to 80%, but preferably from 20 to 40%.

A solvent may also be employed to effect the desired solubility of the active ingredient in the carrier.

The size of the solid unit of the solid solution can vary widely depending on the system. In general, it is desirable to employ particles about the size of beads, for example, having a mesh of from about 3 to 300, such as from about 5 to 100, for example from about 10 to 50, but preferably from about 20 to 40.

Large size units can also be advantageously employed, for example, in cannister treatment of petroleum operations or other processes where one passes fluids through these solid units contained in a separate vessel and thereupon into the system. In such applications larger sized particles, such as about a half inch to about 3 inches or more in diameter, may be employed.

Stated another way, the optimum size of the units will vary with the application provided the chemical can be eluted from the carrier while maintaining its structure during the elution.

The following example are presented by way of illustration and not of limitation.

EXAMPLE A

Twenty parts by weight of polyethylene, 60 parts of Fisher Tropsch Wax and 20 parts of an imidazoline corrosion inhibitor prepared from stearic acid and diethylenetriamine

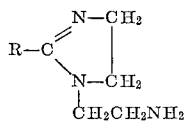

(R derived from stearic acid) were melted and blended. This blended material was sprayed into a chilled air counter-current spray cooling tower to from spherical beads. The diameter of the beads are controlled to diameters of about 50 microns to several mm. by adjusting the spray temperature, pressure and nozzle size.

EXAMPLE B

Corrosion inhibitor beads were prepared in the manner of Example A from 25 parts Fisher Tropsch wax, 30 parts of microcrystalline wax, 20 parts of polyethylene and 25 parts of an acylated polyalkylene polyamine corrosion inhibitor prepared from oleic acid and diethylenetriamine

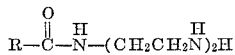

EXAMPLE C

This example illustrates the preparation of a weighted solid unit having the following composition:

| | Parts |
|---|---|
| Fisher Tropsch wax | 12.5 |
| Microcrystalline wax | 15 |
| Polyethylene | 10 |
| Imidazolene corrosion inhibitor of Example A | 12.5 |
| BaSO$_4$ | 50 |

It was prepared in the manner of Example A.

Any suitable corrosion inhibitor can be employed, for example, those of the film-forming or the non-film-forming type. In practice, the film-forming type of corrosion inhibitor is preferred in most instances and therefore it will be more fully discussed.

In general, film-forming organic corrosion inhibitors are generally heteropolar, for example, cationic or anionic in nature. The most widely used type of film-forming corrosion inhibitor is the cationic type, which is generally a comparatively high molar organic compound containing one or more basic nitrogen atoms.

Anionic film-forming inhibitors contain hydrophobic groups, which have generally large hydrocarbon radicals, and acid groups. In general, they are used as the free acid or as salts thereof, for example as alkali or alkaline earth metal, ammonium or amine, etc., salts, for example as the sodium, potassium, calcium, ammonia, amine, etc. salts.

In general, assuming a monomolecular layer, the more effective film-forming corrosion inhibitors are those which cover the largest area per molecule and form the most coherent and oriented film.

Typical, but non-limiting examples, of film-forming corrosion inhibitors are presented below.

Nitrogen bases

A wide variety of these compounds are known to be film-forming corrosion inhibitors. The following are a few non-limiting examples:

(1) Oxazolines (U.S. Pat. 2,587,855)
(2) Tetrahydropyrimides (U.S. Pat. 2,640,029)
(3) Imidazolines (Re. 23,227)
(4) Pyrrolinedinone (U.S. Pat. 2,466,530)
(5) Amino amides (U.S. Pat. 2,550,582 and 2,598,213)
(6) Quaternary amines (U.S. Pat. 2,659,693)
(7) Monoamines, such as Rosin Amine (OIL GAS JOURNAL 46, No. 31, 91–6 (1946)) Oxyalkylated Rosin Amine (U.S. Pat. 2,564,740) Rosin Amine+ solubilizing agent (U.S. Pat. 2,564,757 and 2,564,753)

Carboxylic acids

A wide variety of these compounds are known to be film-forming corrosion inhibitors. The following are non-limiting examples:

(1) Naphthenic acids (U.S. Pat. 2,430,951 and 2,434,978)
(2) Dimerized unsaturated fatty acids (U.S. Pat. 2,632,695)
(3) Fatty acids, such as recinoleic acid (U.S. Pats. 2,481,372 and 2,507,401)
(4) Alkenyl succinic acids (British Pat. 576,089)
(5) Alkenyl succinic acid amine reaction products (U.S. Pats. 2,604,451, 2,568,876, 2,540,800, 2,638,449, 2,638,450, and 2,682,489)
(6) Phthalamic acids (U.S. Pat. 2,408,102)
(7) Monoesters and amides of dicarboxylic acids (U.S. Pat. 2,408,102)
(8) Acid-esters, for example, sorbitan monooleate and fatty acid partial esters of pentaerythritol (U.S. Pats. 2,479,424 and 2,574,954)
(9) Sorbitan and pentaerythritol (U.S. Pat. 2,580,036) Acid-ester and amine salts of fatty acids (U.S. Pats. 2,564,422 and 2,564,423)
(10) Acids from oxidized paraffin wax
(11) Dimerized and polymerized unsaturated fatty acids (U.S. Pats. 2,632,709, 2,627,474, 2,631,979)
(12) Amides of amino acids such as the sarcosines for example

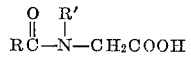

R = fatty hydrocarbon group
R′ = H, lower alkyl

Sulfonic acids

A wide variety of these compounds are known to be film-forming corrosion inhibitors. The following are a few non-limiting examples:

(1) Mahogany sulfonates and salts thereof (U.S. Pats. 2,533,301, 2,533,302, 2,533, 303, 2,533,304, 2,594,266, 2,511,250, 2,598,725, 2,499,710, 2,509,786, 2,582,733)
(2) Synthetic alkyl aryl-sulfonates (U.S. Pats. 2,562,845 and 2,546,522)

Miscellaneous corrosion inhibitors

A wide variety of other compounds are known to be film-forming corrosion inhibitors. The following are a few non-limiting examples:

(1) Acid-esters of phosphoric and thiophosphoric acids.
(2) Subsituted ureas and thioureas.
(3) Propargyl compounds, for example propargyl alcohol, sulfide, etc.

The imidazolines are a member of the cyclic amidine family of compounds and are prepared in the manner described in Reissue 23,227, U.S. Pat. 2,468,163, and elsewhere.

They may be described, for example, as follows:

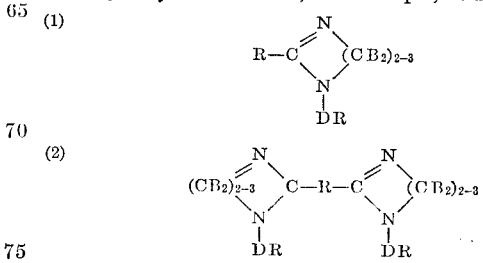

where $$R-\overset{\overset{O}{\|}}{C}- \text{ and } -\overset{\overset{O}{\|}}{C}-R-\overset{\overset{O}{\|}}{C}-$$

are residues derived from the carboxylic acid employed in preparing the compound wherein R is, for example, a hydrocarbon radical, having, for example, up to about 30 carbon atoms, such as 1–30 carbon atoms, B is hydrogen or a hydrocarbon radical, for example, a lower alkyl, such as methyl—for example, where $CB_2$ is $$-\underset{\underset{CH_3}{|}}{CH}-CH_2-, \quad -\underset{\underset{CH_3}{|}}{CH}-\underset{\underset{CH_3}{|}}{CH}-, \quad -CH_2-\underset{\underset{CH_3}{|}}{CH}-CH_2-$$

but preferably —$CH_2$—$CH_2$— or —$CH_2$—$CH_2$—$CH_2$—, and R is the residue derived from the cyclic amidine-forming polyamine, for example where DR is $$-C_nH_{2n}-HR'-R', \quad -C_nH_{2n}-NH-\overset{\overset{O}{\|}}{C}-R', \quad -C_nH_{2n}-O-\overset{\overset{O}{\|}}{C}-R'$$

$$-C_nH_{2n}-O-R', \quad -C_nH_{2n}-NR'-C_nH_{2n}-NR'-R'$$

$$-C_nH_{2n}-HR'-C_nH_{2n}-NR'-C_nH_{2n}-HR'-R'$$

$$-C_nH_{2n}-\underset{\underset{CH_2-CH_2}{|}}{N}\overset{\overset{R}{\underset{|}{C}}}{\diagdown}N, \text{ etc.}$$

and wherein $n$ is, for example, the numeral 1 to 6 and R' is hydrogen or an aliphatic, cycloaliphatic hydrocarbon, etc., radical.

In the simplest case, the group R' may be directly attached to the 1-nitrogen atom of the ring, as follows:

$$R-C\overset{N-CH_2}{\underset{\underset{R'}{N-CH_2}}{\diagdown}}$$

The particularly outstanding corrosion-preventive reagents result when the cyclic amidine contains basic nitrogen groups in addition to those inherently present in the imidazoline ring. In general, compounds of this type which are effective are those in which the basic nitrogen group is contained in the radical D in the above formula.

In this case the products may be represented by the formula $$R-C\overset{N-CH_2}{\underset{\underset{Y-R'}{N-CH_2}}{\diagdown}}$$

where R and R' are hydrogen or a hydrocarbon radical, and in which at least one of the groups R and R' is an aliphatic or cycloaliphatic hydrocarbon group containing from 8 to 32 carbon atoms; and Y is a divalent organic radical containing amino groups. The group R' may be, and usually is, an amino nitrogen substituent. Examples of organic radicals which Y—R' may represent are

—$C_2H_4$—$NR_2'$, —$C_2H_4$—$NR'$—$C_2H_4$—$NR_2'$, —$C_3H_6$—$NR_2'$

—$CH_2$—$\underset{\underset{NR_2'}{|}}{CH}$—$CH_2$, —$CH_2$—$\underset{\underset{NR_2'}{|}}{CH}$—$CH_2OH$, $\underset{-C_2H_4-\underset{\underset{R}{|}}{N}}{\overset{CH_2-CH_2}{\diagup \diagdown}}\underset{\diagdown \diagup}{C}$

—$C_2H_4$—$NR$—$C_2H_4$—$NR'$—$C_2H_4$—$NR_2'$ where R' and R have their previous significance.

Of this class of reagents in which an amino group occurs as a portion of the 1-nitrogen substituent, those which are derived, at least theoretically, from the polyethylene polyamines appear to be particularly effective as corrosion inhibitors. These have the general formula:

$$R-C\overset{N-CH_2}{\underset{\underset{(C_2H_4NR')_mR'}{N-CH_2}}{\diagdown}}$$

where R and R' have their previous meanings, and $m$ is a small number, usually less than 6. Amides of these imidazolines are also effective.

Imidazolines have been described in Re. 23,227. A typical claim is as follows:

"A process for preventing corrosion of metals comprising the step of applying to such metals a substituted imidazoline selected from the class consisting of $$R-C\overset{N-CB_2}{\underset{\underset{H}{N-CB_2}}{\diagdown}} \quad R-C\overset{N-CB_2}{\underset{\underset{R}{N-CB_2}}{\diagdown}} \quad R-C\overset{N-CB_2}{\underset{\underset{DR}{N-CB_2}}{\diagdown}} \quad R-C\overset{N-CB_2}{\underset{\underset{D'R}{N-CB_2}}{\diagdown}}$$

in which D represents a divalent, non-amino organic radical containing less than 25 carbon atoms, composed of elements from the group consisting of C, H, O, and N; D' represents a divalent, organic radical containing less than 25 carbon atoms, composed of elements from the group consisting of C, H, O and N; D' represents a divalent organic radical containing less than 25 carbon atoms, composed of elements from the group consisting of C, H, O and N, and containing at least one amino group; R is a member of the class consisting of hydrogen and aliphatic and cycloaliphatic hydrocarbon radicals; with the proviso that at least one occurrence of R contains 8 to 32 carbon atoms; and B is a member of the class consisting of hydrogen and alkyl radicals having not over 2 carbon atoms, with the proviso that at least three occurrences of B be hydrogen."

Tetrahydropyrimidines have been described in U.S. Pat. 2,640,028 where a typical claim is as follows:

"A process for preventing corrosion of metals including the step of applying to such metals a substituted tetrahydropyrimidine of the formula type:

$$R-C\overset{N-CB_2}{\underset{\underset{D}{N-CB_2}}{\diagdown CB_2}}$$

where D is a member of the class consisting of D'—R and R'D' represents a divalent organic radical containing less than 25 carbon atoms, composed of elements from the group consisting of C, H, O and N; R is a member of the class consisting of hydrogen and hydrocarbon radicals, with the proviso that at least one occurrence of R contains from 8 to 32 carbon atoms; B is a member of the class consisting of hydrogen and hydrocarbon radicals containing less than 7 carbon atoms, with the proviso that at least three occurrences of B be hydrogen."

In general, the preferred embodiments of film-forming corrosion inhibitors are of the type of cyclic amidines described above and acylated alkylene polyamines of the type described in U.S. Pat. 2,598,213 which are by reference incorporated in the present application.

In addition to corrosion inhibitors any suitable chemical can be employed in preparing the solid solutions of this invention. Other non-limiting examples of well treating agents include, O/W and W/O demulsifiers, scale preventives, bactericides, water treating agents, agents employed in enhancing primary and secondary recovery, paraffin removers, etc. The term "well treating agents" includes the use of chemicals in these and other petroleum operations including refineries, transportation, storage, and so forth.

Non-limiting examples of suitable well treating agents can be found in the following patents and publications:

(1) O/W Demulsifiers: 2,470,829, 2,589,198, 2,589,199, 2,589,200, 2,589,201, Re. 22,963
(2) W/O Demulsifiers: 2,499,365, 2,499,366, 2,562,878, 2,549,434, 2,549,435, 2,549,436, 2,549,437, 2,028,266, 2,028,267, 2,028,269, 2,552,528, 2,154,423
(3) Corrosion inhibitors: 2,466,517, 2,466,530, 2,598,213, 2,781,352, 2,828,259, Re. 23,227
(4) Scale preventives: 2,589,195
(5) Bactericides: 2,917,428, 2,912,324, 2,906,708, 2,867,279, 2,839,467, 2,802,785, 2,801,216, 2,733,206

(6) Reagents employed in enhancing primary and secondary recovery: 2,369,831, 2,606,871, 2,633,919, 2,419,755, Chemicals disclosed in "Oil and Gas Journal" 50, No. 14, 97–8 (1951), "Producers Monthly" 16, No. 1, 24–30 (1951)

(7) Paraffin removers: 2,470,831, 2,817,635, 2,818,079, 2,836,559, 2,873,253

As is quite evident, many other well treating chemicals are known and will be constantly developed. It is, therefore, not only impossible to attempt a comprehensive catalogue of such compositions, but to attempt to describe the invention in its broader aspects in terms of specific chemical names of well treating chemicals used would too voluminous and unnecessary since one skilled in the art could by following the description herein and elsewhere select the proper agent. This invention lies in solid solutions of well treating chemicals used in carrying out this invention and their individual composition is important only in the sense that their properties can effect this function.

To precisely define each specific well treating chemical useful in this invention in light of the present disclosure would merely call for knowledge within the skill of the art in a manner analogous to a mechanical engineer who prescribes in the construction of a machine the proper materials and the proper dimensions thereof. From the description in this specification and with the knowledge of a chemist, one will know or deduce with confidence the well treating chemicals suitable for this invention. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any well treating chemical that can perform the function stated herein can be employed.

The above comments apply with equal force and effect to the carrier employed to prepare the solid solutions of the well treating chemicals, many others of which are known and will be discovered in the future.

Non-limiting solid solutions of well treating compositions may be prepared from each of the following.

| | | Composition |
|---|---|---|
| Example | Patent | Example |
| | | O/W demulsifiers |
| 1 | 2,470,829 | Example 1. |
| 2 | 2,589,198 | Example column 13, lines 1–13. |
| 3 | 2,589,199 | Column 12, reaction product Example 2. |
| 4 | 2,589,200 | Column 12, reaction product Example 1. |
| 5 | 2,589,201 | Column 19 demulsifier Example 1. |
| | | W/O demulsifiers |
| 6 | 2,499,365 | Example 1c (Column 136). |
| 7 | 2,499,366 | Example 2c (Column 44). |
| 8 | 2,562,878 | Example 39. |
| 9 | 2,549,434 | Example 3. |
| 10 | 2,549,435 | Example 1. |
| 11 | 2,549,436 | Example 2. |
| 12 | 2,549,437 | Example 1. |
| | | Corrosion inhibitors |
| 13 | 2,466,517 | Column 5, Example 8. |
| 14 | 2,466,530 | Example 1. |
| 15 | 2,598,213 | Example 1. |
| 16 | 2,781,352 | Example 2c. |
| 17 | 2,828,259 | Example 2. |
| | | Scale preventive |
| 18 | 2,589,195 | Example 1. |
| | | Bactericides |
| 19 | 2,917,428 | "Duomeen" C methyl chloride quaternary. |
| 20 | 2,867,279 | Composition III. |
| 21 | 2,839,467 | Example 1(b). |
| 22 | 2,802,785 | Example 1. |
| 23 | 2,801,216 | Glyoxal. |
| 24 | 2,733,206 | Dicoco-dimethylammonium chloride. |
| | | Primary and secondary recovery |
| 25 | 2,369,831 | Composition column 2, lines 52–60. |
| 26 | 2,606,871 | Rosin amines acetate. |
| 27 | 2,638,919 | Silicones. |
| | | Paraffin removers |
| 28 | 2,470,831 | Example 10. |
| 29 | 2,836,559 | (50:50 mixture) kerosene: 20 units polyoxyethylene sorbitan tri-tall oil. |
| 30 | 2,837,253 | Table IA, derivative I. |

In certain instances it may be desirable to employ a weighting agent, for example lead oxide, powdered metal such as powdered lead, barium sulfate, barium oxide, or other desirable heavy materials, most preferably comminuted. The choice of the weighting agent is of course not critical provided it performs its function and is not adversely reactive in the system.

Use as corrosion inhibitor in primary oil production

Where a particular inhibitor is found effective in preventing corrosion in a particular well, the usual method of applying it is to introduce a solution of the inhibitor into the annulus between the well liner and the tubing. The inhibitor solution is mixed with the production stream at the bottom of the well and flows through the tubing together with the produced oil and water. An appreciable number of wells cannot be treated in this manner since a section of the annulus between the liner and tubing has been packed or cemented to control gas pressure. Attempts to treat these wells with an inhibiting solution are usually unsuccessful since the production must be stopped in order to introduce the solution into the tubing and permit it to gravitate to the well bottom, and then upon resumption of production, the solution is very rapidly carried from the well together with the production stream.

It has now been found that the corrosion of ferrous metal tubing, sucker rods, etc., in producing oil wells discharging a production stream comprising crude oil and brine, especially brine containing dissolved or dispersed gaseous carbon dioxide, can be effectively controlled by introducing units of a solid solution of a corrosion inhibitor into the production stream in the lower portion of the well.

Thus, this invention provides a method for preventing corrosion of ferrous metal surfaces in contact with the production stream of producing oil wells. The present invention also provides a form of corrosion inhibitor which is well adapted for use in oil wells having packed annuli.

In addition, this invention provides a form of corrosion inhibiting composition which is highly effective in reducing corrosion rates in producing oil wells, especially in oil wells in which the production stream comprises crude oil, brine, and carbon dioxide gas.

The following example is presented for purposes of illustration and not of limitation.

EXAMPLE 1

Into the annulus of a corrosive gas condensate well containing oil, brine and gas are introduced the small unit corrosion inhibitor prepared in the manner of Example A having diameters of 1–2 mm. Although corrosion occurred prior to the addition of the corrosion inhibitor, corrosion subsequent thereto was substantially reduced or eliminated for an extended period of time.

The inhibitor tagged with tritium and monitored for the rate of the return of the inhibitor gave indicated an extended life of slightly more than one year.

The inhibitor pellets were highly effective in small amounts and production need be interrupted only at infrequent intervals to introduce the charge of the corrosion inhibitor and time required to implement an anti-corrosive program employing the pellets of this invention are obviously small.

The equipment required to introduce the corrosion inhibitor of this invention into the well is of the simplest type. A lubricator having a valve at either end is connected to the well tubing. The valve adjacent to the tubing is closed, the pellets are introduced into the lubricator, the upper valve is then closed, and the valve adjacent to the tubing is opened permitting the pellets to drop into the tubing through the standing oil to the base of the well. In treating a well having an open annulus, the lubricator is attached to communicate with the annulus and the pellets are dropped through the annulus to the base of the tubing.

In some wells where on open bottom communicates with the tubing, the pellets are lowered into the well in a mesh basket to prevent the small units from falling into the open bottom zone of little production.

Other methods of introducing these pellets will be evident to one skilled in the art. For example, these solid unit corrosion inhibitors can be employed in rat holes which can be defined as holes which exist below the producing areas of formation.

Other solid solution chemicals such as demulsifiers, bactericides, scale preventatives, paraffin removers, etc. can be applied in an analogous manner.

Use of corrosion inhibitors in hydraulic fracturing

Among the methods utilized in oil well stimulation is a practice known as hydraulic fracturing or sand fracturing, in which a fluent body of sand in graded sizes is pumped or forced into an oil reservoir to render such formation more permeable and to promote flow of oil from the structure into the production well.

It has been known that corrosion inhibitor compositions, if released in the structure to flow with the oil, will retard the corrosive action to a considerable degree, ant it is beneficial to have the inhibitor in place when pumping begins.

The present invention represents a departure from the usual inhibition methods, by utilizing corrosion inhibitors which are in solid form. They are substantially insoluble in the carrier fluid by which they are conducted into the formation and are eluted slowly in the oil production of the well, which usually has a substantial water content. The inhibitor composition may be water soluble or oil soluble and preferably is only slowly eluted into the formation fluids of the oil stream being conducted through the well. The pellets may be formed to meet size specifications or reduced and sized to meet the size requirements of its intended use. A method is provided for distributing such compositions throughout the reservoir structure and corrosive action is inhibited for a relatively long period due to the slow rate of elution.

A typical procedure according to the present invention is to form solid inhibitor chemicals as pellets which are eluted slowly into the formation fluids. These pellets are sized and mixed with propping sand in the same size ranges until they are uniformly distributed in the sand. This mixture is utilized as the propping sand of a hydraulic fracturing treatment and is pumped into cracks away from the well bore. The pellets are slowly eluted in the formation fluids but supply a sufficient inhibiting effect from the outset, and because the rate of elution is controlled, this effect persists for relatively long intervals.

The quantity of pellets utilized in the treatment will vary with the amount of sand being used, the size of the fractured area, and the productivity of the well. In many treatments where a considerable quantity of sand is being used, an addition of pellets in an amount approximating one percent by volume of the sand will be adequate under most conditions. Under extreme conditions as much as 10% or more might be required in such a mixture, but any amount in excess thereof appears to have no actual benefit and only adds to the cost of the treatment.

The sand-inhibitor mixture is distributed throughout the fractured area according to the usual hydraulic fracturing procedures. As soon as the sand distribution is completed pumping can begin and continues as long as required. The inhibitor commences functioning as pumping begins and continues in the same manner for a long interval providing substantially the same degree of corrosion control throughout the entire period.

In many instances it may be advantageous to introduce a substantial concentration of the inhibitor pellets into the formation preceding the introduction and distribution of propping sand, in order to push the inhibitor far into the formation. In such event, only a lean mixture of inhibitor in the same will suffice, as the formation fluids will contain dissolved inhibitor on reaching the propping sand.

EXAMPLE 2

400 pounds of the pellets prepared in the manner of Example A (10–40 mesh), 1000 pounds of sand and 1,000 gallons of gelled water were employed in a well fracture operation. The inhibitor was tagged with tritium, to a total activity of 3.4 Curies, and monitored. Inhibitor return based on radioactive techniques of tritium assay correlated with corrosion rate gave little, if any, corrosion, i.e. a rate of less than 0.5 mil per year (m.p.y.), whereas untreated the well in question has corroded at rates as high as 100 m.p.y.

By following these techniques other well treating agents such as demulsifiers, bactericides, surfactants, etc. can be employed as an analogous manner in hydraulic fracturing.

These solid solution inhibitors can also be employed in other applications where corrosion is a problem such as in tanks, pipelines, refineries, etc.

Having thus described our invention what we claim as new and desire to claim by Letters Patent is:

1. A process for treating an oil well system comprising introducing into said system a solid solution of a corrosion inhibitor dissolved in a solid carrier, said solid carrier being substantially insoluble in said system and said corrosion inhibitor being capable of being eluted out of said solid carrier by said system at a rate sufficient to effectively treat said system with said corrosion inhibitor over the desired prolonged period of time, said solid solution retaining its integral structure during the elution of said corrosion inhibitor therefrom, thereby allowing the corrosion inhibitor to be leached out during the prolonged period of time, said oil well system corrosion inhibitor being selected from the group consisting of

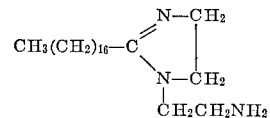

and

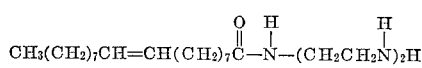

said solid carrier being selected from the group consisting of
a mixture of polyethylene and Fisher Tropsch wax, a mixture of Fisher Tropsch wax and microcrystalline wax and a mixture of polyethylene, Fisher Tropsch wax and microcrystalline wax.

2. The process of claim 1 wherein said corrosion inhibitor is

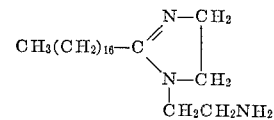

and said solid carrier is a mixture of polyethylene and Fisher Tropsch wax.

3. The process of claim 1 wherein said corrosion inhibitor is

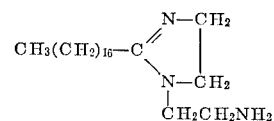

and said solid carrier is a mixture of polyethylene, Fisher Tropsch wax and microcrystalline wax.

4. The process of claim 1 wherein said corrosion inhibitor is

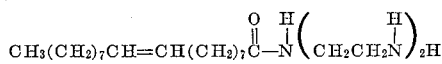

and said solid carrier is a mixture of polyethylene, Fisher Tropsch wax and microcrystalline wax.

5. A solid solution of an oil well system corrosion inhibitor dissolved in a solid carrier, said solid carrier being substantially insoluble in said oil well system into which it is introduced and said corrosion inhibitor being capable of being eluted out of said solid carrier by said oil well system at a rate sufficient to effectively treat said system with said corrosion inhibitor over a desired prolonged period of time, said solid solution being capable of retaining its integral structure during the elution of said corrosion inhibitor therefrom, said oil well system corrosion inhibitor being selected from the group consisting of

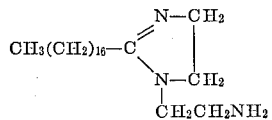

and

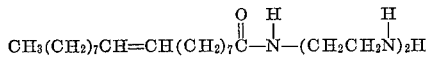

said solid carrier being selected from the group consisting of
a mixture of polyethylene and Fisher Tropsch wax,
a mixture of Fisher Tropsch wax and microcrystalline wax and a mixture of polyethylene, Fisher Tropsch wax and microcrystalline wax.

6. The solid solution of claim 5 wherein said corrosion inhibitor is

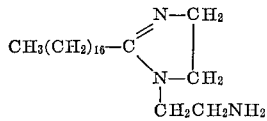

and the solid carrier is a mixture of polyethylene, Fisher Tropsch wax and microcrystalline wax.

7. The solid solution of claim 5 wherein the solid carrier is a mixture of polyethylene and Fisher Tropsch wax and the corrosion inhibitor is

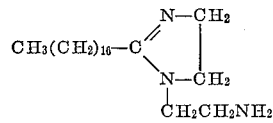

8. The solid solution of claim 5 wherein the corrosion inhibitor is

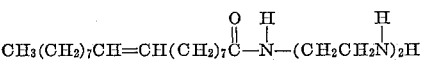

and the solid carrier is a mixture of polyethylene, Fisher Tropsch wax and microcrystalline wax.

References Cited

UNITED STATES PATENTS

| | | | |
|---|---|---|---|
| 2,290,154 | 7/1942 | Blair | 252—344 |
| 2,589,195 | 3/1952 | Monson | 252—180 X |
| 2,598,213 | 5/1952 | Blair | 252—8.55 |
| 2,599,384 | 6/1952 | Gross et al. | 252—8.55 |
| 2,599,385 | 6/1952 | Gross et al. | 252—8.55 |
| 2,824,059 | 2/1958 | Chamot | 252—8.55 |
| 2,833,712 | 5/1958 | Jones | 252—8.55 |
| 2,867,279 | 6/1959 | Cocks | 252—8.55 X |
| 3,051,653 | 8/1962 | Skolaut et al. | 252—8.55 X |
| 3,275,552 | 9/1966 | Kern et al. | 252—8.55 |
| 2,890,125 | 6/1959 | Mange | 106—10 |
| 3,251,778 | 5/1966 | Dickson et al. | 252—180 |
| 3,262,791 | 7/1966 | Dickson et al. | 252—390 |

HERBERT B. GUYNN, Primary Examiner

U.S. Cl. X.R.

166—279, 280, 304; 252—180, 331, 390, 392; 424—358